United States Patent [19]

Hulls

[11] Patent Number: 5,662,267
[45] Date of Patent: Sep. 2, 1997

[54] CONTROLLED ATMOSPHERE TRANSFER SYSTEM

[75] Inventor: John Hulls, Point Reyes Station, Calif.

[73] Assignee: Dauenhauer Manufacturing, Inc., Santa Rosa, Calif.

[21] Appl. No.: 488,076

[22] Filed: Jun. 7, 1995

[51] Int. Cl.$^6$ .......................... B05B 15/04; B05B 17/04; B05B 5/08
[52] U.S. Cl. .................. 239/8; 239/13; 239/104; 239/176; 239/124; 239/288
[58] Field of Search .................. 239/176, 148, 239/104, 172, 288, 124, 1, 13, 8, 693, 695, 704, 690, 3; 47/1.7

[56] References Cited

U.S. PATENT DOCUMENTS

| | | | |
|---|---|---|---|
| 1,465,557 | 8/1923 | Oldham. | |
| 4,865,628 | 9/1989 | Iwanczyk | 47/1.7 X |
| 4,893,755 | 1/1990 | Keathley | 239/288 X |
| 5,002,227 | 3/1991 | Ehrenberg | 239/290 X |
| 5,028,002 | 7/1991 | Whitford | 239/8 |
| 5,246,166 | 9/1993 | Payne | 239/104 |
| 5,380,367 | 1/1995 | Bertone | 222/630 X |
| 5,469,653 | 11/1995 | Roehrick | 47/1.7 |

FOREIGN PATENT DOCUMENTS

| | | | |
|---|---|---|---|
| 126304 | 12/1945 | Australia. | |
| 546395 | 9/1957 | Canada. | |
| 291837 | 11/1988 | European Pat. Off. | 239/176 |
| 2606672 | 5/1988 | France. | |
| 2666672 | 5/1988 | France | 239/120 |

OTHER PUBLICATIONS

Brochure: IMAG-DLO "Innovative Engineering and Technology for Sustaining Agriculture and Horticulture" 23 pages (1994).
D.L. Peterson et al. "Tunnel Sprayer For Dwarf Fruit Trees" Transactions of the ASAE, vol. 37(3), pp. 709 and 711 (1994).

*Primary Examiner*—Kevin Weldon
*Attorney, Agent, or Firm*—Limbach & Limbach L.L.P.

[57] ABSTRACT

The method and apparatus of the present invention provides a more efficient and cost effective method and apparatus for applying agents to plants, crops, vegetation, and trees, while avoiding the problems associated with conventional impingement velocity tunnel sprayers. The method and apparatus of the present invention utilizes the conditions in a controlled atmosphere to deposit agents on plants and provides a device which increases the maneuverability of pesticide spray rigs.

23 Claims, 6 Drawing Sheets

CONTROLLED ATMOSPHERE TRANSFER SYSTEM

BACKGROUND OF THE INVENTION

1. Field of the Invention

The present invention relates generally to an apparatus and process for applying pesticides and other agents and materials to agricultural crops, vines, trees and vegetation.

2. Description of the Related Art

Insecticides and other agents are commonly applied to crops and other types of vegetation using a variety of techniques, including tunnel sprayers. In a conventional tunnel sprayer, a tractor is used to pull or push a spray rig apparatus such as is disclosed in U.S. Pat. No. 4,893,755 issued to J. Phillip Keathley ("Keathley"). In sprayers, similar to Keathley, a canopy or tunnel is formed around a segment of crops or vegetation. A spraying apparatus is then used to inject the desired agent into the confined canopy area. The canopy avoids, to some extent, drift of the agent away from the desired site of application. It is also known to use troughs within a tunnel sprayer canopy to recover and recirculate agent which has deposited on the inner walls of the canopy.

Conventional tunnel sprayers deposit aerosol particles of an agent on crops by spraying the agent directly on to the crops. Thus, existing sprayers known in the art rely on the kinetics of the aerosol particles. There are several mechanisms and effects at work in such an aerosol environment. The principle factor is the droplet size in the aerosol spray. The larger the droplets, the less the surface area on the droplets for a given amount of spray, and the less loss to evaporation. This would seem to favor large droplets. However, other effects then come into play.

If a relatively small number of large droplets are used to coat a plant, there will have to be significant overcoverage to insure that the plants are wetted. This means that some areas of the plant surface will receive excessive pesticide to insure complete coverage, and thus the application will be inefficient. In addition, the possibility of both excessive droplet size and precipitation from collision is greatly increased with larger initial droplet sizes.

If, in a conventional sprayer, the droplets are too small, there will be much greater surface area for a given volume of spray, and there will be excessive evaporation and drift. Given these two conflicting effects, the tendency for spray applications has been to use the largest droplets consistent with efficient coverage. The majority of sprays are applied well in excess of 40 microns for field applications. While the tunnel sprayer limits some of the drift problems, it does not eliminate the conflicting requirements of droplet size and application.

Additional constraints are presented by the requirements for bringing the droplets into contact with the plants. There has been much study of the impact mechanism whereby droplets wet a surface. A collision between aerosol droplets and a surface such that they wet a surface is referred to in the literature as an "effective" collision. There are a large number of factors that influence the mechanism but the size of droplets was found to have an appreciable effect. In a study by Hartley and Brunskill, *Surface Phenomena in Chemistry and Biology*, Permagon Press (1958) collisions on pea leaves were effective when the droplet size was less than 50 microns, and ineffective when greater than 125 microns. On rough surfaces of the plant, the effect was largely independent of the angle of impact.

In a conventional sprayer, the small droplets in the aerosol mix would lose velocity rapidly and would drift in the atmosphere and would either coagulate into larger droplets, or evaporate and become water vapor. However, the larger droplets would require greater numbers of impacts to produce effective coverage of the plant, and higher velocities.

The other major factor affecting the ability of the droplets to have effective collisions with the plant surface is the wetting of the surface itself. It has been shown in studies by McCully that when particles or the surface are rendered hydrophobic, the effectiveness of collisions is significantly decreased. (McCully, C, et al., *Ind. Eng. Chem.*, 48, 1512 (1956), as referenced in Fuchs, et al, *The Mechanics of Aerosols*, Dover Press (1989).) The influence of wettability is greatly increased when the kinetic energy of the collisions is low. In the past, pesticide application has relied on high kinetic energy either by the use of large droplets or large droplets in conjunction with high velocity. Thus, the ideal state would be to have high wettability and low kinetic energy while still maintaining the effectiveness of collision.

Conventional tunnel sprayers known in the art provide neither of the two conditions, high wettability and low kinetic energy, required for ideal application of pesticide agents to crops. As seen in U.S. patent application No. 2,977,715 issued to M. E. Lindsay ("Lindsay") the agent is randomly deposited on the leaves of the vegetation by velocity impingement of the spray onto the vegetation. Lindsay teaches spraying agent into a column of air and then impinging the air column upon plant foliage at an increased velocity. Although Lindsay discloses spraying the aerosol agent into a duct before blowing the air column into the canopy, Lindsay does nothing to change the aerosol environment. Thus, the conditions identified above which produce the best application of the agent are absent from Lindsay.

Conventional devices control the force of impingement by the pressure supplied by blowers. In devices such as Lindsay, the air discharge is at a substantial velocity such that it causes agitation of the plants; however, because such spray rigs rely on impingement velocity, they do not always apply the agents evenly on the vegetation. Second, more agent than would be desired is deposited on the ground beneath the plants. These factors increase the financial and environmental costs of operating such devices because large quantities of pesticide agents are required and wasted.

In addition to providing inefficient and ineffective coverage of the agent on the target crops, the conventional devices are further disadvantageous because their method of application results in shingling. Shingling occurs when the force of the spray or air is so strong that the leaves of the crops press against each other. The result is that one leaf covers all or a portion of the leaf which is behind it, thereby preventing coverage of both leaf surfaces. This phenomenon is inherent in the conventional tunnel sprayers because the high velocity required to impinge the large aerosol particles against the crops.

As a result of the above factors, the problem facing the development of a more efficient method and apparatus for the application of agents to crops is to integrate a variety of conflicting requirements involving evaporation, droplet size, inertia of particles, wettability of surfaces and design of a suitable apparatus.

A further problem associated with the use of tunnel sprayers is the turning radius required to turn the tunnel sprayer around in the headland area. The headlands are minimized to increase the percentage of land utilizable for planting; thus, there is a limited turning radius. Therefore, minimal space at the end of a row of crops is provided. Tractors pulling the conventional sprayer, especially tunnel sprayers, cannot be used or are used with difficulty in such areas. Thus, it is desirable to minimize the turning radius of the tractors used in spraying operations and the equipment which they pull.

It is therefore an object of this invention to provide a more efficient and cost effective method and apparatus for applying agents to crops, vegetation, and trees, while avoiding the problems associated with conventional impingement velocity tunnel sprayers.

Another object of the invention is to utilize a process which will create a large number of effective collisions while nevertheless operating with comparatively low velocities.

Yet another object of this invention is to provide an apparatus and method which will decrease the operation costs of applying agents by maximizing the actual deposition of agents to the crops.

A still further object of the invention is to reduce wasted pesticide agents due to evaporate loss in the deposition process by the means of application and recapture from within the apparatus for reapplication to the crops.

A still further object of the present invention is to minimize the turning radius required for the tractor when pulling a tunnel sprayer.

SUMMARY OF THE INVENTION

In order to meet these objects, the invention described herein relates to methods and apparatus for applying an agent to plants, vines, trees, or vegetation using the condensation and coagulation effects of conditions in an oversaturated atmosphere. In a preferred embodiment an apparatus according to the invention comprises a saturation chamber for containing a saturated atmosphere, the saturated atmosphere being at a first pressure, a deposition chamber, the deposition chamber having a pressure less than the pressure of the saturation chamber; and a means for creating the saturated atmosphere containing at least one agent. The saturated atmosphere may be created using the agent or created separately using, for example, a water base fog. In the latter case, the agent is injected into the water base fog saturated atmosphere.

In another embodiment, an apparatus of the present invention includes a recovery and recirculation system, further including a plurality of brushes formed in the deposition chamber, to capture excess agent that is not applied to the plants.

In a still further embodiment, an apparatus of the invention includes a means for maintaining the deposition chambers parallel to a vertical axis of the plants.

In yet another embodiment, an apparatus according to the invention comprises a means for lifting the deposition chambers above the crops so that a tractor carrying the apparatus may turn in small radius areas, such as headland areas in planted fields.

BRIEF DESCRIPTION OF THE DRAWINGS

The invention will be better understood by reference to the appended Figures, in which.

DETAILED DESCRIPTION OF THE INVENTION

The invention will now be described in detail. The apparatus and method of the present invention rely on conditions in an atmosphere created around plants to apply an agent, such as a pesticide or other chemical or organic product, to plants such as vines, crops, shrubs, trees, or other vegetation. By utilizing conditions in a controlled atmosphere, the apparatus and method of the invention minimizes the shortcomings of conventional tunnel sprayers which rely on the kinetics of aerosol particles.

Figure 1:
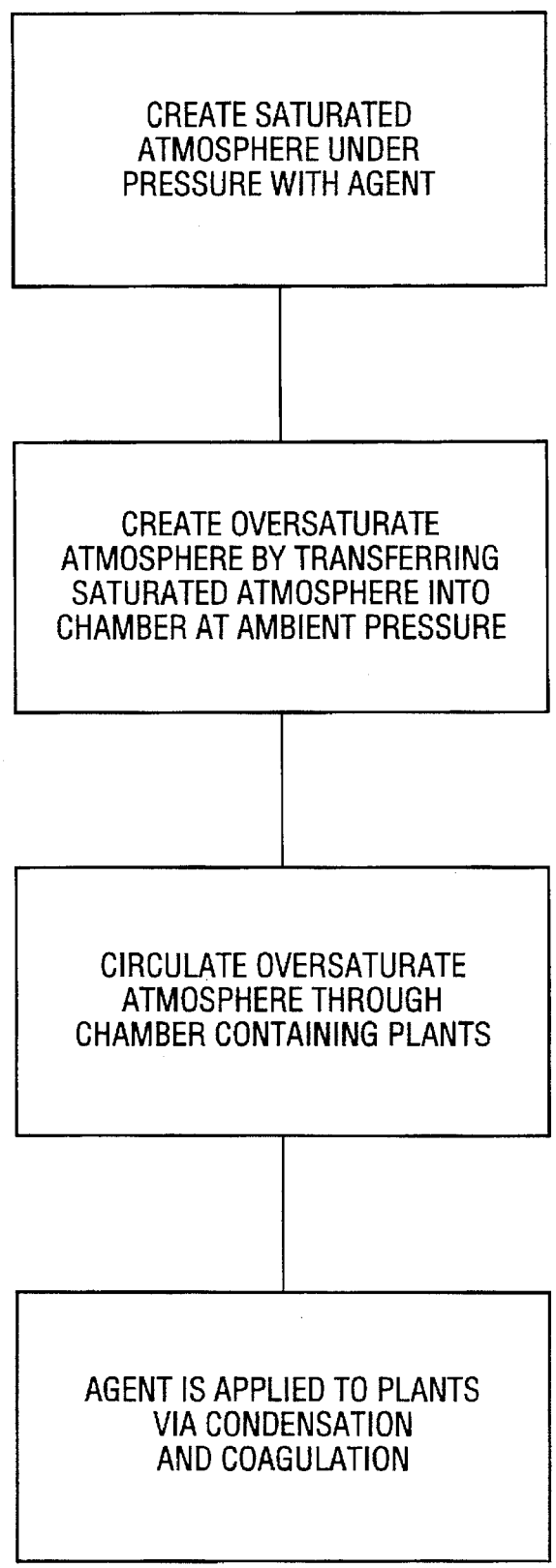
FIG. 1 is a block diagram depicting the process of the invention.

In the method of the invention, shown in FIG. 1, a saturated atmosphere containing the agent to be applied is formed under pressure. The saturated atmosphere is then transferred to an area, proximate to the plants, which is at ambient pressure or a pressure less than that of the saturated atmosphere. As a result of the pressure differential, an oversaturated atmosphere is created. Through the process of condensation and coagulation of the aerosol particles, the agent is efficiently applied to the plants. The method can be practiced by forming the saturated atmosphere with the liquid agent. Should the crop shape or configuration warrant, the saturated atmosphere and agent may be injected independently of each other. In such case, the saturated atmosphere can be formed first such as with water vapor, and then the agent is injected into the saturated atmosphere.

By use of an oversaturated atmosphere to surround the plants, the desired agent is deposited on the plant leaves through the atmospheric conditions created in a manner which avoids the usual velocity-impingement phenomenon, typical of conventional spray rigs. For this reason even sensitive or delicate plants may be treated. The method of the invention may also be practiced by placing an electrostatic charge in the saturated atmosphere to increase the deposition of the agent on the plants.

Naturally, the agent used in the apparatus will need to be in liquid form. However, agents which are typically produced in powder form can be solubilized in order to create the liquid agent for the process. Those who commonly use sprayers will recognize that the apparatus of the invention can therefore be used with any liquid or solubilized agent.

Figure 2:
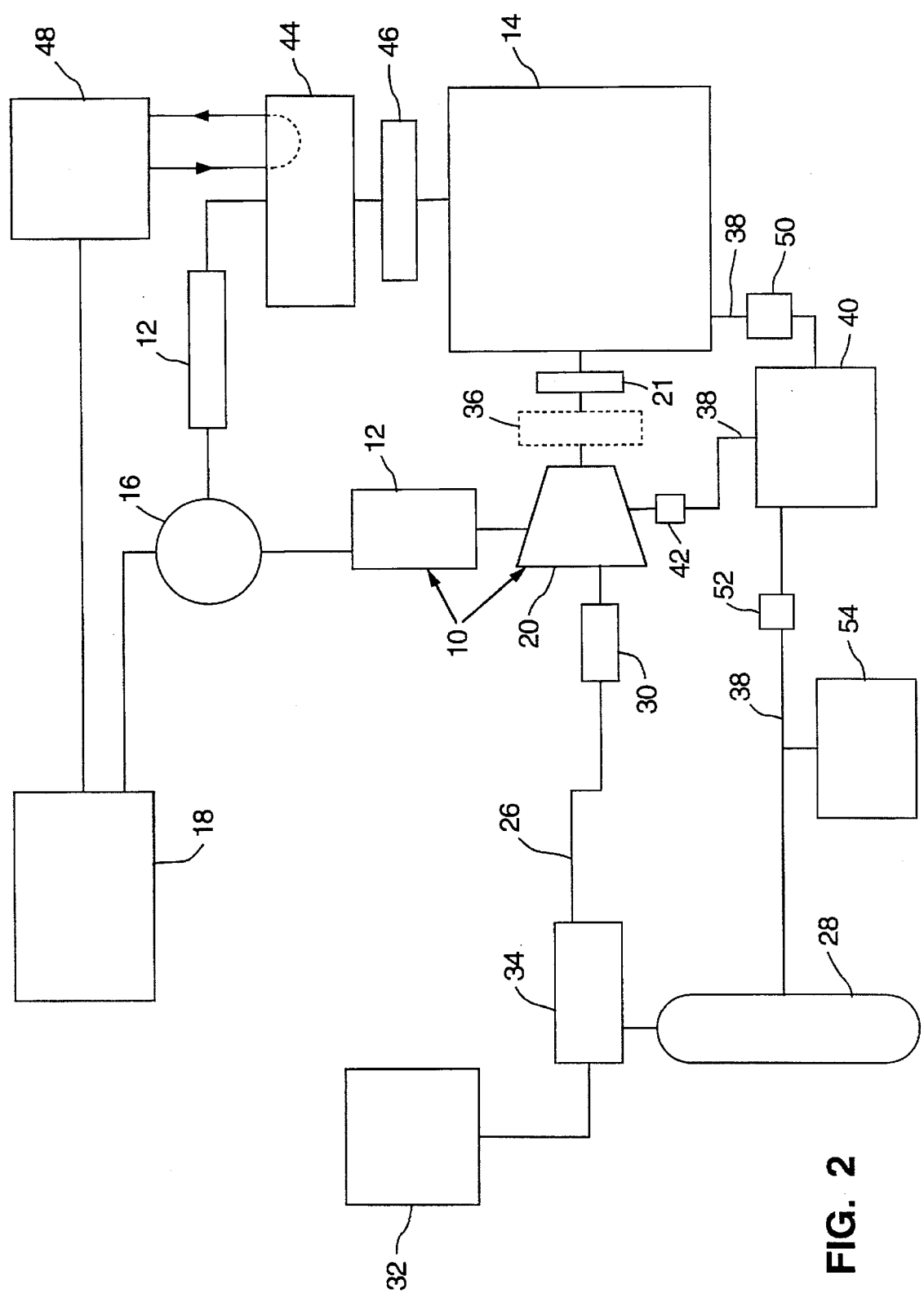
FIG. 2 is a block diagram depicting the operational steps of the invention in an apparatus according to the invention.

A preferred embodiment of the apparatus of the invention, shown in FIGS. 2–4, will now be described. Referring to FIG. 2, a saturation chamber 10 includes a plurality of ducts 12 coupled to the deposition chamber 14. The saturation chamber 10 is pressurized by blowers 16 hydraulically powered by a hydraulic pump 18. The blowers 16 preferably operate at 3–5 psi. The volume of saturation chamber 10 is variable, but it must provide a sufficient area of mixing where the pressure is above ambient such that the air volume will become saturate upon injection of the agent. The saturation chamber 10 is pressurized such that there is pressure differential of several psi between saturation chamber 10 and deposition chamber 14. The optimum pressure depends on the agent and the rate of application.

The ducts 12 terminate on a plurality of vent boxes 20 which are exposed to an interior cavity 22 of deposition chamber 14. The vent boxes 20 are located in proximity to the lower edges of deposition chamber 14. A flow director 21 may also be used to direct the air flow into the deposition chamber Again referring to FIG. 2, the means for creating a saturated atmosphere will now be described. A supply line 26 carries the agent in liquid form, from a feed tank 28 to conventional spray nozzle injectors 30 protruding into at least one vent box 20. The nozzle injectors 30 produce droplets in the range of 30 to 60 microns. Equivalent injectors, such as, disk type atomizers, commonly known as controlled droplet applicators (CDAs) may also be used. A feed pump 32 pressurizes the supply line 26. The supply line 26 is conventional rubber, plastic, or metallic tubing, approximately ½ inches in diameter. The feed pump 32 is powered by hydraulic pump 18. The feed tank 28 is coupled to supply line 26 via an educator 34. The agent is drawn from feed tank 28 by educator 34 when hydraulic pump 32 is actuated. As the agent is injected into vent boxes 20 through nozzle injectors 30, a fog is formed in saturation chamber 10. Vent boxes 20 are in fluid communication with ducts 12 pressurized by blowers 16. Thus, the atmosphere in ducts 12 also becomes saturated. The saturated atmosphere then flows into deposition chamber 14.

It is not necessary that the saturated atmosphere be created with the agent. A saturated atmosphere could be formed prior to injecting an atomized liquid agent, using for example, a water base fog.

The application of agent to the plants is controlled by restricting the flow of the saturated atmosphere into deposition chamber 14 and by regulating the output pressure of blowers 16. A baffle 36 or other restriction means may be used to restrict the size of the opening of vent box 20. Flow director 21 may also serve this purpose. In conjunction with restricting vent box 20, the output pressure of blower 16 may also be varied.

In a preferred embodiment, shown in FIG. 3, the saturated atmosphere is injected into the deposition chambers 14 from a position below the plants, generally adjacent the stalk, in an upward direction. The circulation of the atmosphere from this position and the deposition process resulting from the atmosphere thereof, reduces shingling effects. As the oversaturated atmosphere contacts the plants, the agent condenses on the plants. The condensation forms relatively evenly on both upper and lower sides of the plants, thereby providing an even and thorough application of the agent. At the same time, the agent coagulates in small droplets in the air surrounding the plants. These droplets fall on the plant surfaces at a low kinetic energy, further increasing the coverage of the agent on the plants.

In the embodiment of the invention shown in FIGS. 2 and 3, the oversaturated atmosphere is circulated back into saturation chamber 10 via intake boxes 44 mounted on deposition chambers 14. Intake boxes 44 are in communication with the air fluid flow in ducts 12 and deposition chamber 14. As a result of the draw created by blowers 16, the oversaturated atmosphere is drawn through a vent 46 (shown in FIG. 2) formed in intake box 44. The oversaturated atmosphere moves through intake box 44 and back into ducts 12 for circulation through the saturation chamber 10.

As the oversaturated atmosphere moves through intake box 44 it is heated by a radiator 48. The radiator 48 is mounted within intake box 44 such that it is at least partially exposed to interior cavity 22 of deposition chamber 14. The heating increases the amount of condensation that forms on the plants, thereby making the application of the agent more efficient. The radiator 48 carries warm hydraulic fluid from hydraulic pump 18. Thus, radiator 48 cools the hydraulic fluid for the operation of hydraulic pump 18, while simultaneously warming the oversaturated atmosphere. Equivalent heating means such as electric heaters or other heaters known in the art may also be used.

As shown in FIGS. 3 and 4, applicant's invention is provided with a recovery and recirculation means for capturing excess agent which does not stay on the plants, and recirculating it back into feed tank 28. Recovery troughs 50 channel excess agent into a sump 40 via a fluid conduit 38 and then through a series of filters 52. A syphon 54 then moves the recovered agent through fluid conduit 38 back into feed tank 28. Alternatively, a sump pump could also be used. During recovery and recirculation, excess condensate captured on brushes 56 and on wall surfaces 71 inside deposition chamber 14, drain into sump 40 and is drawn back into feed tank 28 via syphon 54. Additional excess agent which condenses in vent boxes 20 also drains through an opening 42 into the sump 40 via fluid conduit 38.

A preferred structural embodiment of the invention is shown in FIG. 3, wherein deposition chambers 14 are pivotally coupled to a tower frame 55. The plurality of saturation chambers 10 are mounted to deposition chambers 14.

Tower frame 55 has a main support member 58, two telescoping arms 60 extending laterally from main support member 58, a support frame 62, a 3-point hitch connection 64, and a power take off shaft (PTO) 66. A rotating joint 68 couples deposition chambers 14 to telescoping arms 60 on either side of the tower frame 55. Thus, deposition chambers 14 may rotate in the direction shown by arrow "C" to compensate for variations in the grade of the ground surface.

The invention can be practiced with one or more deposition chambers 14 depending upon the number of rows of plants which are to be simultaneously treated. The apparatus is suspended above the ground and moved over one or more rows of plants by a conventional tractor. The apparatus is coupled to the tractor using a standard 3-point hitch 65 such as the M5950 SAE Category I and II hitch manufactured by Kubota Tractor Corporation in Compton, Calif. Using 3-point hitch 65, the elevation of the apparatus in relation to the ground surface may be adjusted. In an alternative embodiment, a drive means may be incorporated into the structure of tower frame 55 thereby eliminating the need for a separate tractor.

In the preferred embodiment, the two deposition chambers 14 shown in FIG. 3, are comprised of a chamber support frame 70, each having a pair of wall portions 71, a cover portion 72, an ingress opening 74, and an egress opening 76. Deposition chambers 14 are constructed in a U-shape such that the intersection between wall portions 71 and cover portions 72 define interior cavity 22 through which the rows of plants pass through. Wall portions 71 also have an interior surface 78 and an exterior surface 80. A pair of flexible brushes or flaps (not shown) for containing the oversaturated atmosphere in the deposition chamber 14 may be coupled on chamber support frame 70 so as to cover ingress opening 74 and egress opening 76. Wall portions 71 may be formed of a suitable metal or plastic, or wall portions 71 may consist of a durable rubber drape, or equivalent.

Referring to the detail view shown in FIG. 4, recovery trough 50 extends along the lower edge of wall portion 71 on interior surface 78. The recovery trough 50 is sloped such that it acts as a channel and drains excess agent, which has condensed from the oversaturated atmosphere into sump 40 (shown in FIG. 2). Brushes 56, extend at an inclination relative to the ground surface, from interior surface 78 into interior cavity 22 of deposition chambers 14. Brushes 56, located in proximity to the lower edge of interior surface 78, extend to an intermediate position in deposition chambers 14. The brushes 56 flex against the trunks or stalks of the plants and assist in filtering loose materials in the plants from the excess condensate. The brushes 56 are made of plastic, metal, or other equivalent material, but the brushes should be of sufficient flexibility such that the plants are not damaged upon contact.

The brushes 56 may also be insulated from interior surface 71 and used to apply a static charge to the plants for the purpose of electrostatically precipitating moisture from the oversaturated atmosphere. This requires the use of brushes 56 which are electrically conductive, as well as a charging means such as current from a conventional battery or generator.

Figure 3:
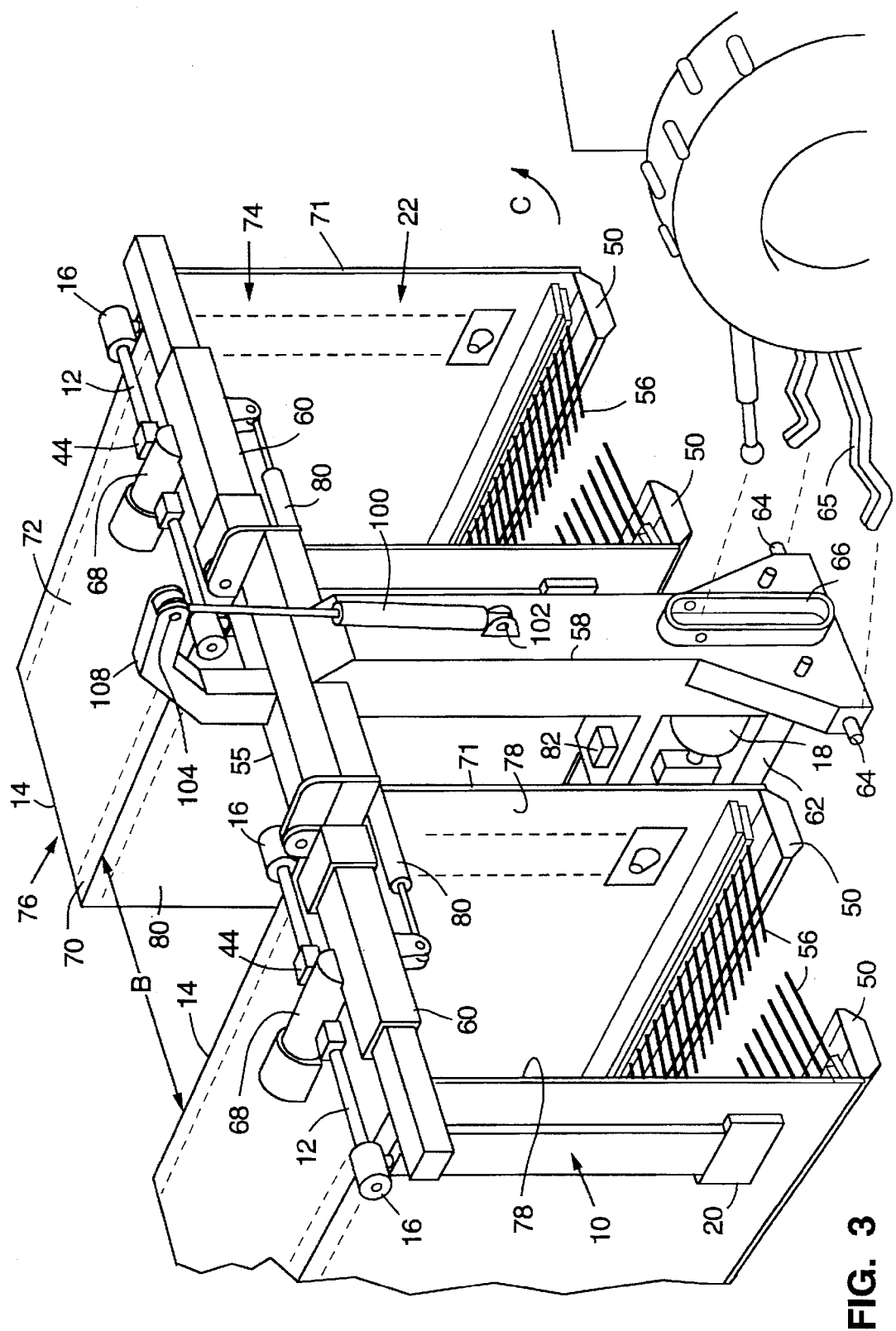
FIG. 3 is a perspective view of an apparatus according to the invention.
Figure 4:
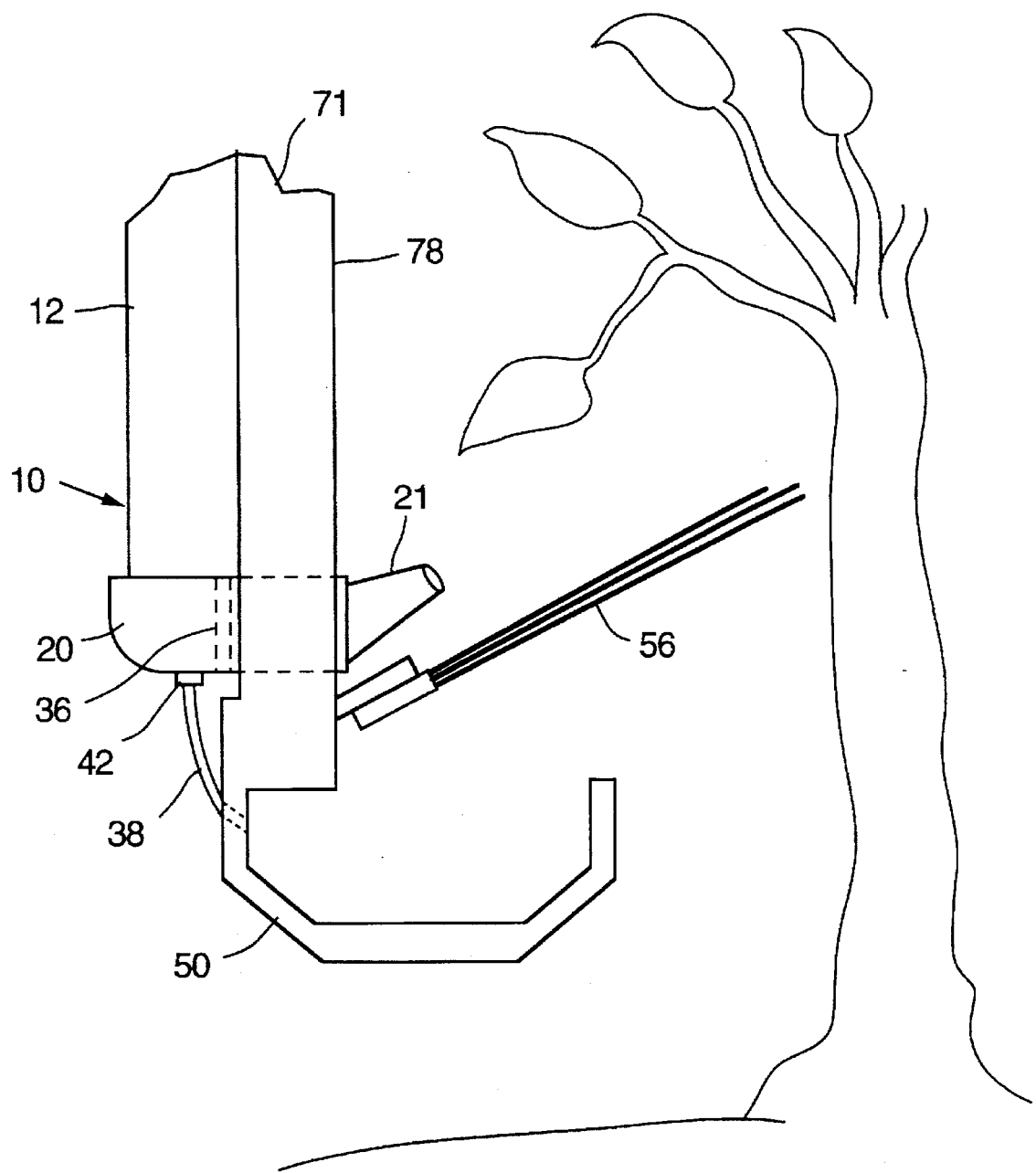
FIG. 4 is a detail view of an apparatus according to the invention.

In a preferred embodiment, shown in FIG. 3, the apparatus of the invention includes a means for adjusting for variations in the width between rows of plants. Thus, width "B" between deposition chambers 14 can be adjusted to correspond to the width between rows of plants. The width adjusting means comprises telescoping arms 60, a pair of hydraulic arms 80, and a control means 82. One end of hydraulic arm 80 connects to a segment of telescoping arm 60. The other end of hydraulic arm 80 connects to tower frame 55. Hydraulic arms 80 are driven by hydraulic pump 18 which may be mounted on support frame 62. Hydraulic pump 18 is supplied with power via the PTO 66 from the tractor which carries the apparatus. When the control means 82 activates hydraulic arms 80, telescoping arms 60 are extended or retracted, and deposition chambers 14 are correspondingly displaced in a direction away from or towards each other, thus increasing or decreasing width "B".

Figure 5:
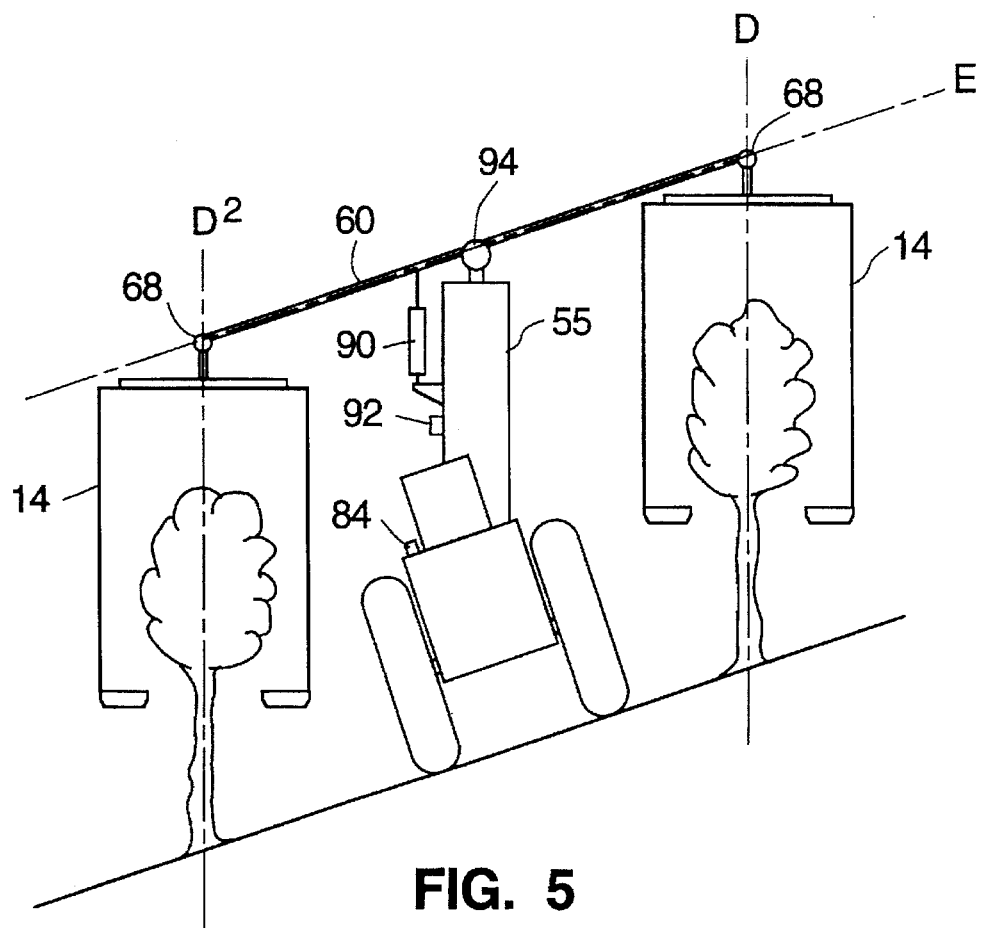
FIG. 5 is a front view of an apparatus according to another aspect of the invention.

Referring to FIG. 5, the invention also includes a means for levelling. The levelling means compensates for variations in the grade of the ground surface such that a vertical axis "D" of deposition chambers 14 may be maintained in a position substantially parallel to a vertical axis of the plants "D." The levelling means comprises a means for maintaining frame tower 55 in a vertical position and a means for adjusting a horizontal axis of telescoping arms 60.

Figure 5A:
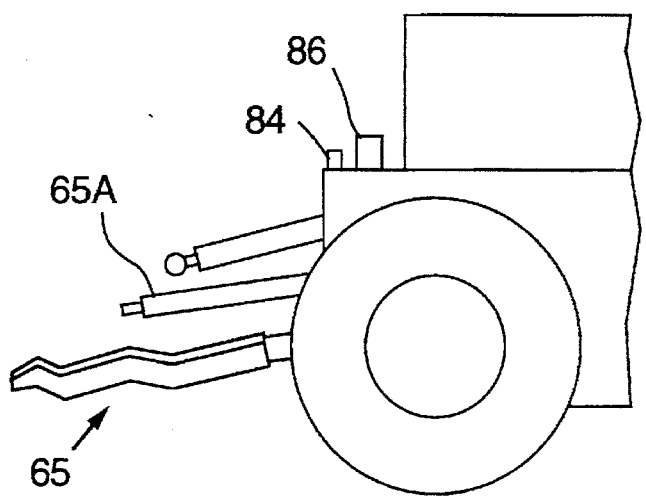
FIG. 5A is a detail view of an embodiment of a 3-point hitch connection according to the invention.

The means for maintaining frame tower 55 in a substantially vertical position comprises a levelling sensor 84 and 3-point hitch 65 (shown in FIG. 5A) wherein one of the three levers is a hydraulic lever 65A. In the preferred embodiment, an Automatic Platform Leveler Model 410 manufactured by P-Q Controls Inc. in Bristol, Conn., is used as levelling sensor 84. The levelling sensor 84 is mounted on the tractor and detects changes in the grade of the ground surface. In response to any such changes, leveling sensor 84 sends a signal to an actuator 86 which controls hydraulic lever 65A. Movement of hydraulic lever 65A causes a corresponding change in the position of tower frame 55, which is suspended above the ground surface by the connection to 3-point hitch 65. In this manner, tower frame 55 can be held in a substantially vertically position.

As shown in FIG. 5, when the apparatus is on a graded ground surface, the horizontal axis "E" of telescoping arms 60 is maintained at a substantially parallel position relative to the ground surface. In a preferred embodiment, the means for adjusting the horizontal axis of telescoping arms 60 comprises a levelling sensor 84, a hydraulic cylinder 90, a second actuator 92, and a second rotating joint 94, which couples telescoping arms 60 to tower frame 55. Hydraulic cylinder 90 is coupled at one end to tower frame 55 and at the other end to telescoping arm 60.

When the apparatus is on a graded surface, levelling sensor 84 detects the change in grade and sends a signal to second actuator 92. In response, second actuator 92 causes hydraulic cylinder 90 to extend or retract. The action of hydraulic cylinder 90 causes telescoping arms 60 to rotate about second rotating joint 94, thereby changing the horizontal axis of telescoping arms 60. Since deposition chambers 14 are coupled to telescoping arms 60 via rotating joint 68, the vertical axis "D" of the deposition chambers 14 can be maintained parallel to the vertical axis "$D^2$" of the plants, despite changes in the grade of the ground surface. This configuration allows the plants to pass through deposition chambers 14 in an unobstructed manner.

Levelling sensor 84 may be pre-set such that the vertical position of tower frame 55 and the horizontal position of telescoping arms 60 may be maintained constant.

Figure 6:
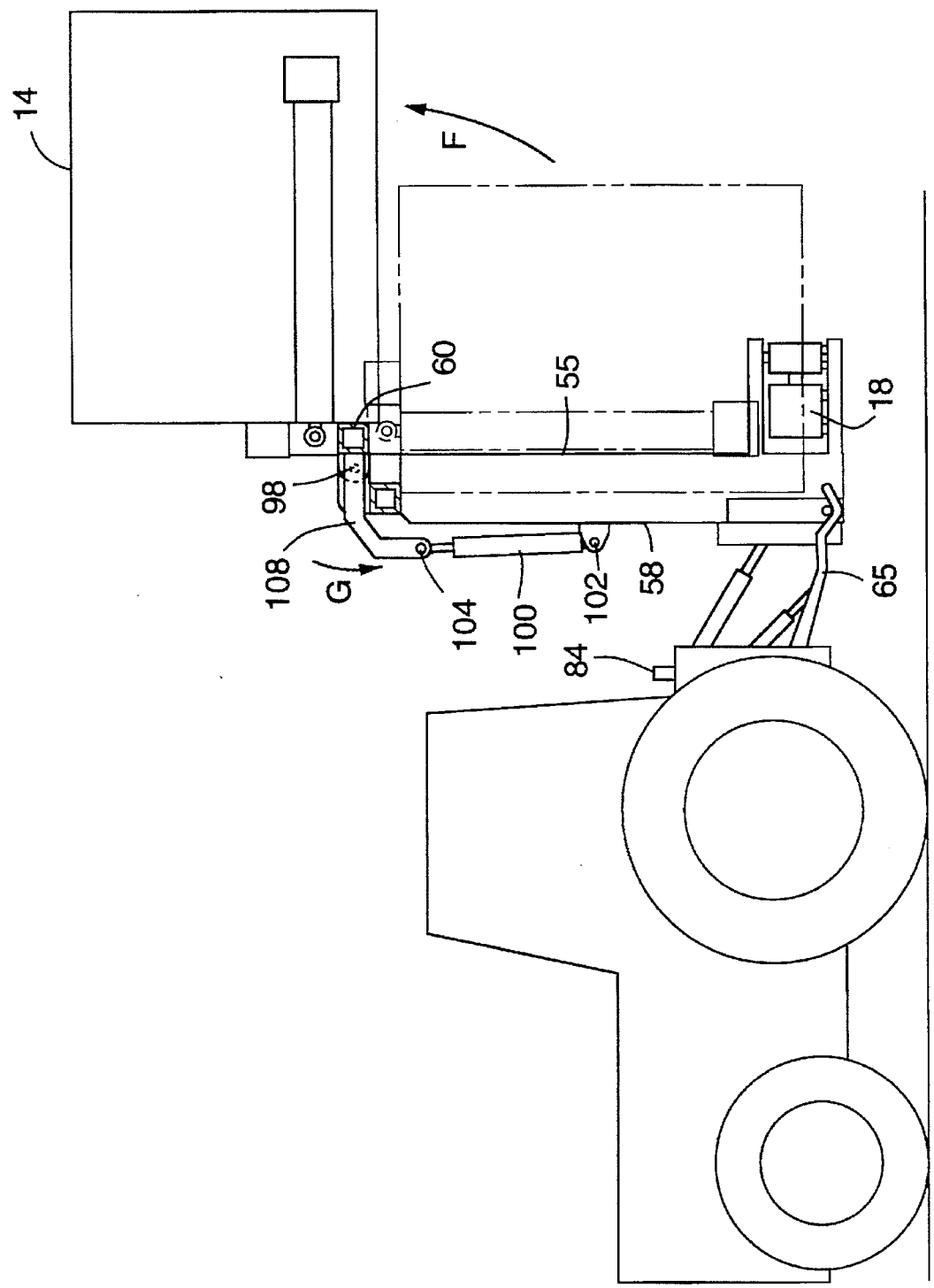
FIG. 6 is a side view of an apparatus according to yet another aspect of the invention showing the deposition chambers in a lifted position.

As shown in FIG. 6, a further embodiment of the invention comprises a means for lifting deposition chambers 14 above the plants. Telescoping arms 60 are pivotally coupled to tower frame 55 through pivot connection 98. A hydraulic arm 100 or equivalent driving means, powered by hydraulic pump 18, is connected at one end 102 to main support 58. At the other end 104, hydraulic arm 100 is coupled to a cantilever member 108. Cantilever member 108 is integrally formed with telescoping arms 60.

When hydraulic arm 100 is retracted, cantilever member 108 is pulled towards the ground surface as shown by arrow "G" in FIG. 6. As a result, telescoping arms 60 are rotated about pivot connection 98 in the direction shown by arrow "F". The deposition chambers 14 are thereby rotated to a position above the plants so that deposition chambers 14 pass over the tops of the plants when the tractor and apparatus are turned. Thus, the turning radius of the tractor is not increased when utilized with the apparatus of the present invention. Consequently, the tractor, and the present invention, may turn around in small headland areas typical in planted fields Without colliding with the plants.

Although only certain embodiments have been described in detail, those skilled in the art will understand that many modifications are possible without departing from the teachings hereof. All such modifications are intended to be encompassed within the following claims.

What is claimed:

1. An apparatus for applying an agent to plants, vines, trees or vegetation, comprising:
   a) a saturation chamber;
   b) a deposition chamber;
   c) means for creating a saturated atmosphere including said agent in said saturation chamber;
   d) means for circulating said atmosphere into said deposition chamber; and
   e) restriction means positioned between said saturation chamber and said deposition chamber for maintaining a pressure difference between said saturation chamber and said deposition chamber whereby the atmosphere in said saturation chamber is maintained at a pressure greater than a pressure in said deposition chamber, said atmosphere becoming oversaturated as it passes into the deposition chamber so as to cause condensation onto a surface of a plant, vine, vegetation or tree positioned in said deposition chamber.

2. An apparatus according to claim 1, further comprising means for circulating at least a portion of the atmosphere from the deposition chamber to the saturation chamber.

3. An apparatus according to claim 1, further comprising means for capturing and recirculating excess condensation which forms in the deposition chamber.

4. A apparatus according to claim 3, wherein the deposition chamber has an upper wall, two end walls having openings therein to permit the passage of plants onto which deposition is desired, and two side walls, said apparatus further comprising a condensate recovery system including a plurality of brushes extending inwardly from said side walls at an upward angle relative to said walls such that condensate falling on said brushes runs along a surface of said brushes toward said walls, and a recovery means for recovering and reusing condensate collected on said brushes.

5. A spray apparatus according to claim 4, wherein the said recovery means comprises a collection trough positioned along a lower edge of at least one of said side walls.

6. A spray apparatus according to claim 4, wherein the brushes are electrostatically charged.

7. A apparatus according to claim 1, wherein the pressure in the deposition chamber is ambient pressure.

8. A apparatus according to claim 1, wherein the difference in pressure between the deposition chamber and the saturation chamber is from about 3 to about 5 psi.

9. A apparatus according to claim 1, comprising means for adjusting a vertical axis of the deposition chamber.

10. An apparatus for applying an agent on plants such as vines, trees, or vegetation, comprising:
   a support frame;
   a saturation chamber for containing a saturated atmosphere, the saturated atmosphere being at a first pressure;
   a deposition chamber pivotally coupled to the support frame, having an interior portion, an inlet portion and an outlet portion, the deposition chamber shaped to accommodate the passage of plants through the interior portion, the deposition chamber further having a second pressure less than the first pressure of the saturation chamber;
   means for forming the saturated atmosphere in the saturation chamber;
   means for circulating the saturated atmosphere into the deposition chamber to form an oversaturated atmosphere therein and
   for circulating at least a portion of said oversaturated atmosphere to said saturation chamber; and means for heating said portion of said saturated atmosphere as it is circulated.

11. A spray apparatus according to claim 10, further comprising means for controlling the rate of transfer of the at least portion of the saturated atmosphere from the saturation chamber to the deposition chamber.

12. An apparatus according to claim 10, comprising means for lifting the deposition chamber from a first ground position to a second raised position.

13. An apparatus according to claim 10, further comprising means for electrostatically charging the oversaturated atmosphere.

14. A method for applying an agent to plants, vines, vegetation, or trees, comprising the steps of:
   a) creating a saturated atmosphere at a first pressure in a first chamber, said saturated atmosphere including an agent to be applied to plants, vines vegetation or trees;
   b) circulating the saturated atmosphere into a deposition chamber having a second pressure less than the pressure of the saturation chamber, the difference in pressure between the first chamber and the deposition chamber being adequate to cause said saturated atmosphere to become oversaturated and thereby causing the formation of droplets containing the agent in said deposition chamber and on desired surfaces of the plants vines, vegetation or trees.

15. The method according to claim 14, further comprising the step of: moving the deposition chamber along a horizontal surface such that plants pass through the deposition chamber.

16. The method according to claim 14, further comprising the step of: circulating at least a portion of the oversaturated atmosphere from the deposition chamber to the saturation chamber.

17. The method according to claim 14, further comprising the step of: recirculating excess condensation into the saturation chamber.

18. The method according to claim 14, further comprising the step of heating the portion of the oversaturated atmosphere which is circulated to said first chamber.

19. The method according to claim 14, further comprising the step of electrostatically charging the plants, vines, vegetation or trees.

20. A method for applying an agent to plants, vines, vegetation, or trees, comprising the steps of:
   a) creating a saturated atmosphere in a first chamber at a first pressure, said saturated atmosphere including an agent;
   b) circulating the saturated atmosphere into a deposition chamber having a second pressure less than the pressure of the first chamber and containing a plant, vine, vegetation or tree, the difference in pressure between the saturation chamber and the deposition chamber being adequate to cause the formation of droplets containing the agent in said deposition chamber and on desired surfaces of the plant, vine, vegetation or tree; and
   controlling the rate of application of agent to the plant vine, vegetation or tree by controlling the pressure difference between said saturation chamber and said deposition chamber.

21. A method for applying an agent contained in a liquid to plants, vines, vegetation or trees in a device including a saturation chamber and a deposition chamber, said method comprising the steps:
   a) saturating an atmosphere in said saturation chamber with a liquid comprising an agent to be applied to plants, vines, vegetation or trees;
   b) circulating said atmosphere from said saturation chamber into said deposition chamber;
   c) maintaining a pressure difference between said saturation chamber and said deposition chamber by restricting the flow of said atmosphere between said saturation chamber and said deposition chamber, said pressure difference being adequate to cause condensation from said atmosphere in said deposition chamber.

22. The method of claim 21, comprising the further step of controlling said pressure difference to control the application of said agent to plants, vines, vegetation or trees positioned within said deposition chamber.

23. The method of claim 21 wherein said pressure difference is from about 3 to about 5 p.s.i.

* * * * *